United States Patent [19]
Rockwood

[11] Patent Number: 5,261,676
[45] Date of Patent: Nov. 16, 1993

[54] SEALING ARRANGEMENT WITH PRESSURE RESPONSIVE DIAPHRAGM MEANS

[75] Inventor: Robert E. Rockwood, Windham, N.H.

[73] Assignee: Environamics Corporation, Seneca Falls, N.Y.

[21] Appl. No.: 803,007

[22] Filed: Dec. 4, 1991

[51] Int. Cl.$^5$ .............................................. F16J 15/36
[52] U.S. Cl. ..................................... 277/42; 277/65; 277/88
[58] Field of Search ................. 277/1, 2, 42, 43, 65, 277/88, 92

[56] References Cited

U.S. PATENT DOCUMENTS

| | | |
|---|---|---|
| 2,005,429 | 6/1935 | Lichenstein . |
| 2,373,609 | 4/1945 | Stahl . |
| 2,382,960 | 8/1945 | Compton et al. ..................... 277/42 |
| 2,386,505 | 10/1945 | Puchy . |
| 2,903,970 | 9/1959 | Elovitz et al. . |
| 2,984,505 | 5/1961 | Andresen et al. ................ 277/88 X |
| 3,027,165 | 3/1962 | Kempff et al. ..................... 277/88 X |
| 3,112,708 | 3/1963 | Kaufmann . |
| 3,122,375 | 2/1964 | Greenweld ..................... 277/42 X |
| 3,195,035 | 8/1965 | Sudmeier . |
| 3,624,763 | 11/1971 | Rohr . |
| 3,655,295 | 4/1972 | Mitchell . |
| 4,199,155 | 4/1980 | Day et al. . |
| 4,439,096 | 3/1984 | Rockwood et al. . |
| 4,521,151 | 6/1985 | Frater et al. . |
| 4,613,141 | 9/1986 | Henien . |
| 4,688,806 | 8/1987 | Heilala ................................. 277/88 |
| 4,813,689 | 3/1989 | Stalter et al. ......................... 277/65 |
| 4,900,039 | 2/1990 | Klecker et al. ................... 277/65 X |
| 4,915,579 | 4/1990 | Whittier et al. . |
| 5,011,166 | 4/1991 | Watts . |

FOREIGN PATENT DOCUMENTS

| | | |
|---|---|---|
| 2822499 | 11/1978 | Fed. Rep. of Germany . |
| 1040304 | 10/1953 | France ................................. 277/42 |
| 941683 | 7/1982 | U.S.S.R. . |

*Primary Examiner*—William A. Cuchlinski, Jr.
*Assistant Examiner*—Scott W. Cummings
*Attorney, Agent, or Firm*—Wolf, Greenfield & Sacks

[57] ABSTRACT

A seal construction is provided for sealing a rotating shaft against passage of a fluid along its central axis. The sealed construction includes a sealing flange fixedly mounted on the shaft and rotatable with the shaft. The sealing flange has a forward and rear surface extending radially from the central axis of the rotating shaft, the forward surface of which is exposed to the fluid to be sealed against. There is then provided a stationary sealing mechanism for creating a fluid seal between the rear surface of the rotatable sealing flange and this stationary sealing mechanism. A diaphragm is then provided across a fluid passageway associated with the rear surface of the stationary sealing mechanism in such a way such that any increase in pressure in the fluid to be sealed against upon the diaphragm will cause the diaphragm to flex radially inwardly, thereby increasing the area of the rear surface of the engaging member exposed to the fluid pressure which then further urges a tighter seal.

6 Claims, 9 Drawing Sheets

SEALING ARRANGEMENT WITH PRESSURE RESPONSIVE DIAPHRAGM MEANS

FIELD OF THE INVENTION

This invention relates to new and improved pump protection systems and components thereof for isolating a pump motor and surrounding environment in which the pump is used, from a fluid pumped.

BACKGROUND OF THE INVENTION

Pumps are often used in conjunction with gases or liquids such as acids, oils, and toxins which can cause serious harm to the environment if they escape. Thus, when pumping a dangerous liquid from one location to another, it is important that neither the liquid nor gas which is often released by the liquid, escape to the atmosphere or pump areas outside the desired fluid pumping path.

In the 1930's mechanical seals were developed to overcome prior pump shaft sealing problems. This permitted a more secure seal against liquids from escaping along the shaft of the pump. However, in some cases liquid escaped when the pressure within the pump became too high for the seal to handle. The competing interests of maintaining an efficient pump and a safe pump required appropriately balancing the two requirements. Predicting the amount of safety required could only be broadly approximated based on the type of liquid to be pumped. The more hazardous the liquid, the more secure the seals.

The other problem with the mechanical seals of the 1930's was that the gases which were produced by the liquids were not always stopped. The seals were often easily permeated by the vapor. One solution to this problem was the creation of an arrangement known as a double seal with a barrier fluid protection. In this arrangement, the two seals form a cavity which is then filled with a clean fluid. The seal facing the excess liquid, that which does not exit the pump where desired, inhibits the movement of the liquid sufficiently to prevent passing of the liquid. The vapor which can permeate the seal is stopped by the clean fluid in the cavity.

One of the problems with this double seal system was that any failure by the first seal could defeat the protection system. Either gases from the liquid could then escape through the barrier to the environment or the liquid could break through the second seal. This would sometimes ruin the motor and the therefore the pump. A failure of the second seal prior to failure of the first seal would result in the same problems. By allowing the clean fluid to escape from the cavity, the atmosphere would effectively be on the other side of the first seal, the only remaining working seal. The breaking of seals was a problem since the fluid within had to be maintained at a high pressure to be effective, or at least a pressure higher than the pressure of the liquid being pumped.

Some development in the field created pumps in which the motor was entirely within the pump housing. One type is known as the canned motor pump. Here, the motor could fail for many reasons. Sometimes corrosive liquids would affect the motor. Also, the bearings of the motor as well as other motor parts could clog which increased downtime of the system. This type of pump further was not desirable for use with very hot or dirty liquids. Finally, the efficiency of the system could be lower because the rotating parts of the motor would have to turn within a liquid which caused additional friction during operation. Even higher friction forces occurred because sleeve bearings had to be used instead of ball bearings, since the liquid pumped filled the bearing area.

The use of magnetic pumps was an attempt to solve many of the problems by having the pump housed entirely within a single body and driven by a motor surrounding the body. The motor and pump are magnetically coupled, one magnet is attached to the motor and a magnet of opposite polarity is attached to the pump within the body. However, the magnet pump has the same problem as the canned motor pump with respect to the bearings also exposed to the liquid which is being pumped by the machine. Furthermore, the magnetic pump often generates a lot of heat which is difficult to cool sufficiently to prevent meltdown of the pump. The efficiency in operating a magnetic pump can be quite low because of the loss of energy in transferring the motor movement magnetically through the body to the pump shaft.

SUMMARY OF THE INVENTION

The principle object of the present invention is to provide a pump which enables the user to efficiently and safely pump hazardous and other fluids.

Another object of the present inventions is to provide a pump whereby the motor is protected from any fluid that might attempt to enter through the pump system.

It is still a further object of the present invention to provide a pump that has plural seals, preventing the escape along a shaft axis of liquid or gas, which seals may be adjusted during use.

It is still a further object of the present invention to provide a repeller assembly useful in a pump, wherein the repeller has a double disk and vane arrangement which reverses the direction of escaped liquid.

It is still a further object of the present invention to provide a triplex seal arrangement and components thereof, wherein the triplex seal is adjustable to act as a barrier and prevent escape of various fluids under a wide range of pressures.

It is still a further object of the present invention to provide a piston seal arrangement barrier enabling the user to manually or automatically adjust the pressure on the seal within a pump or other mechanism having a rotating shaft to be sealed.

It is further object of the present invention to provide a lubricating assembly to properly lubricate a bearing system in a mechanical arrangement having bearings surrounding a rotating shaft.

It is further object of the present invention to provide a pump having a fan assembly mounted on a housing while magnetically coupled to an environmentally sealed motor within the housing for cooling the motor during operation of the pump.

It is a further object of this invention to provide safe and efficient rotary shaft sealing methods as pumping methods.

The pump construction of the present invention comprises a pump body or casing housing a motor and a rotatable drive shaft connected thereto, with an impeller for pumping and expelling pump liquid or gas being pumped. A repeller and a triplex seal act as axial flow preventing barriers. Preferably the pump has, in addition, a piston seal in series with the triplex seal along the drive shaft, with both seals acting as barriers to fluid passing by the impeller. The pump is, preferably, constantly and automatically lubricated by an oil mister. Finally, the motor is, preferably, magnetically coupled to a fan assembly for cooling the motor.

According to the invention, the pump arrangement or construction, preferably, has a an impeller for impelling of fluid through the pump and the impeller is mounted on an axially extending drive shaft. A repeller, comprising a circular flange, is fixed in position on the shaft to seal the shaft against fluid flow from the impeller. The repeller acts as a barrier, although not forming a full seal. The repeller, preferably, has a plurality of radially extending vanes defining a plurality of substantially enclosed channels, each defining a radially extending opening on a surface thereof. The channels are sized and shaped to provide a volute channel for attenuating swirling fluids passing from the impeller to the repeller and to reverse directions of at least some of the fluids.

A preferred seal construction for sealing the rotating shaft of the pump along a central axis of the shaft has a sealing flange or disc fixed to the shaft for rotation therewith. The flange carries a circular sealing surface on a first side. The sealing surface is in sliding contact at a first mating surface, with a second mating sealing surface formed by a sealing tube, so that a sliding fluid seal is formed at the mating surfaces of the sealing surface and sealing tube. The seal acts as a barrier to fluid contained in the pump and prevents flow along the shaft. The tube is operatively associated with a pressure applying surface which determines closing force of the seal, with that surface being positioned opposed to the second sealing surface. A flexible diaphragm, having at least two positions for respectively enlarging or decreasing the surface area of the pressure applying surface is provided, with the sealing tube attached thereto and being fixed against rotation about the axis of the seal and movable along the axis, to provide for sealing pressure at the mating sealing surfaces. The diaphragm defines, in part, a backup chamber for the sliding rotary seal.

In a preferred embodiment, the rotary seal includes monitoring means in a backup chamber, for allowing liquid or gas access and egress from the chamber, and for measuring pressure within the backup chamber. Preferably, a plurality of fixed stops limit the two positions of the flexible diaphragm.

In the most preferred embodiment, the seal is a triplex seal and comprises a plurality of three coaxial tubes having three sliding surfaces defining two backup chambers. At least one flexible diaphragm arrangement is provided for giving the flexibility of predetermining the seal closing pressure by determining predetermined fixed positions of the diaphragm to vary the backup pressure surface and, therefore, effect sealing pressure. In this manner, sealing pressure can be minimized while providing for desired sealing with minimized frictional contact.

A method of sealing a rotating shaft against axial flow of liquids there along, comprises providing a circular flange fixed on a drive shaft, with a first sliding, enclosing sealing surface on the flange, and tube means having a mating surface for contact with the sliding surface. The tube means is provided with a pressure applying surface and diaphragm means for varying pressure on the pressure applying surface. Fluid on one side of the flange applies a sealing pressure and the sealing pressure is modified to actually compress the tube against the flange to form a sliding seal, which modification is carried out by proper selection of diaphragm position to vary a pressure applying surface.

According to the invention, a pump comprises a pump shaft having a central axis and flange fixed to the shaft carrying a circular sealing surface thereon forming a mating seal surface. A spring loading sealing tube is resiliently urged toward the first mating seal surface and the tube defines a rear surface for defining a sealing pressure on the seal surface. The tube is stationary with respect to axial rotation about the axis, but is resiliently fixed for movement along said axis caused by pressure on the pressure applying surface. A fluid reservoir has a defined volume and means for varying the volume or pressure of fluid to vary hydraulic pressure in the fluid reservoir and, therefore, vary the sealing pressure.

A mechanism is provided for simultaneously providing lubrication to two coaxially located, spaced apart, substantially coaxial rotary bearings mounting a shaft such as a pump shaft. A dispenser is mounted coaxially with the coaxially aligned rotating bearings. The dispenser rotates in a liquid reservoir and has means for entraining a liquid from the reservoir and bringing liquid to nozzles provided on the dispenser, to dispense the liquid from the nozzles directly to each of the rotary bearings. Plural nozzle means direct the fluid in the direction desired and preferably act as misters to mist the lubricating fluid. The dispenser can use a plurality of bristles as nozzles, or can have oppositely directed nozzles to preferably provide just the lubrication necessary and no over supply of liquid which might tend to obstruct the bearings. The bearings can be sealed so that no outside contaminants are exposed to the bearings.

An enclosed pump motor construction has a magnetic means mounted on a motor shaft for rotation thereabouts. An environmentally leak-proof, non-magnetic casing encloses the motor and motor shaft with a cooling fan being independently mounted for free rotation on an axis coaxial with the axis the motor workshaft and is located outside of the casing. The cooling fan means carries a second magnetic means for coupling with the first magnetic means to turn therewith when the motor shaft is rotated, whereby the pump motor is cooled by direct flow from the cooling fan.

In still another rotary seal for rotating shafts, a disc is fixed to the shaft for rotation therealong. The disc defines a first sealing surface encircling the shaft. A tubular member is coaxially located with respect to the shaft and stationary about the axis of rotation of the shaft, but mounted for movement along the shaft by resilient means to engage the first sealing surface at a second sealing surface of the tube. The tube has a rear pressure applying surface opposed to the seal surface and a fluid chamber contacts the pressure applying surface. Means are provided for varying pressure in the chamber to vary the sealing pressure at the sealing surface of the disc and tube. Preferably, the chamber is filled with a fluid and the fluid pressure is varied by the use of a reciprocal piston. The piston can be reciprocated by a screw cap, as desired, to obtain the desired sealing pressure.

Pumps in accordance with the invention use one or more of the seals of this invention. In the most preferred embodiment, a pump construction has a repeller means, triplex seal, piston seal and isolated fan means in accordance with this invention.

It is a feature of this invention that dangerous fluids can be easily pumped, utilizing one or more of the features of the present invention and, preferably, all of them in a preferred pump construction. A leak-proof pump is obtained which can meet critical emission controls set out by substantially all environmental protection and government laws. The triplex seal, in particular, acts as a positive seal against fluid pressures of from 0 p.s.i.a. to 425 p.s.i.a. along the axis of the shaft. Thus, the most difficult seal, i.e., the first fluid seal after the repeller, is of novel construction which permits good sealing, yet minimized friction by proper preselection of sealing pressure. The triplex seal can be monitored to determine pressure in a backup chamber thereof. Automatic pump shut-down can be carried out if monitoring uncovers a pressure change that indicates fluid leakage. The triplex seal and variants thereof can be used as shaft seals in a number of different end uses. The repeller used can vary greatly, although the preferred construction provides a good means for reversing a substantial amount of flow towards the impeller in the pump arrangement of the present invention.

Because the pumped liquid never enters the bearing chamber and because the rotary bearings can be lubricated by the dispenser, full ball or roller bearings can be used, rather than conventional sleeve bearings. This permits maximum thrust and radial load resistance for longer pump life and lower heat generation. Because the triplex and pump seals are barriers, pump fluids do not pass to the bearings and the pumps of this invention can pump particle carrying fluids that would otherwise contaminate the bearings.

The second seal, having a piston acting to provide sealing pressure, provides good backup protection in an environmental pump, as does the seal obtained by encasing the motor and providing for cooling outside of the flow path of the pump and outside of any leakage flow path of the pump. In spite of the many seals and positive flow barriers provided by the pump of the present invention, pumps can vary in size and purpose for a wide variety of purposes, including pumping of acids, bases, gases, compression of gases and the like. Moreover, such pumps can be constructed using substantially conventional construction techniques at minimized cost and expense, with high reliability and accuracy, using conventional motors, bearings, impellers, casings and the like.

These and other objects and features of the present invention will be better understood and appreciated from the following detailed description of basic embodiments thereof, selected for the purpose of illustration and shown in the accompanying drawings, in which:

DETAILED DESCRIPTION

Figure 1:
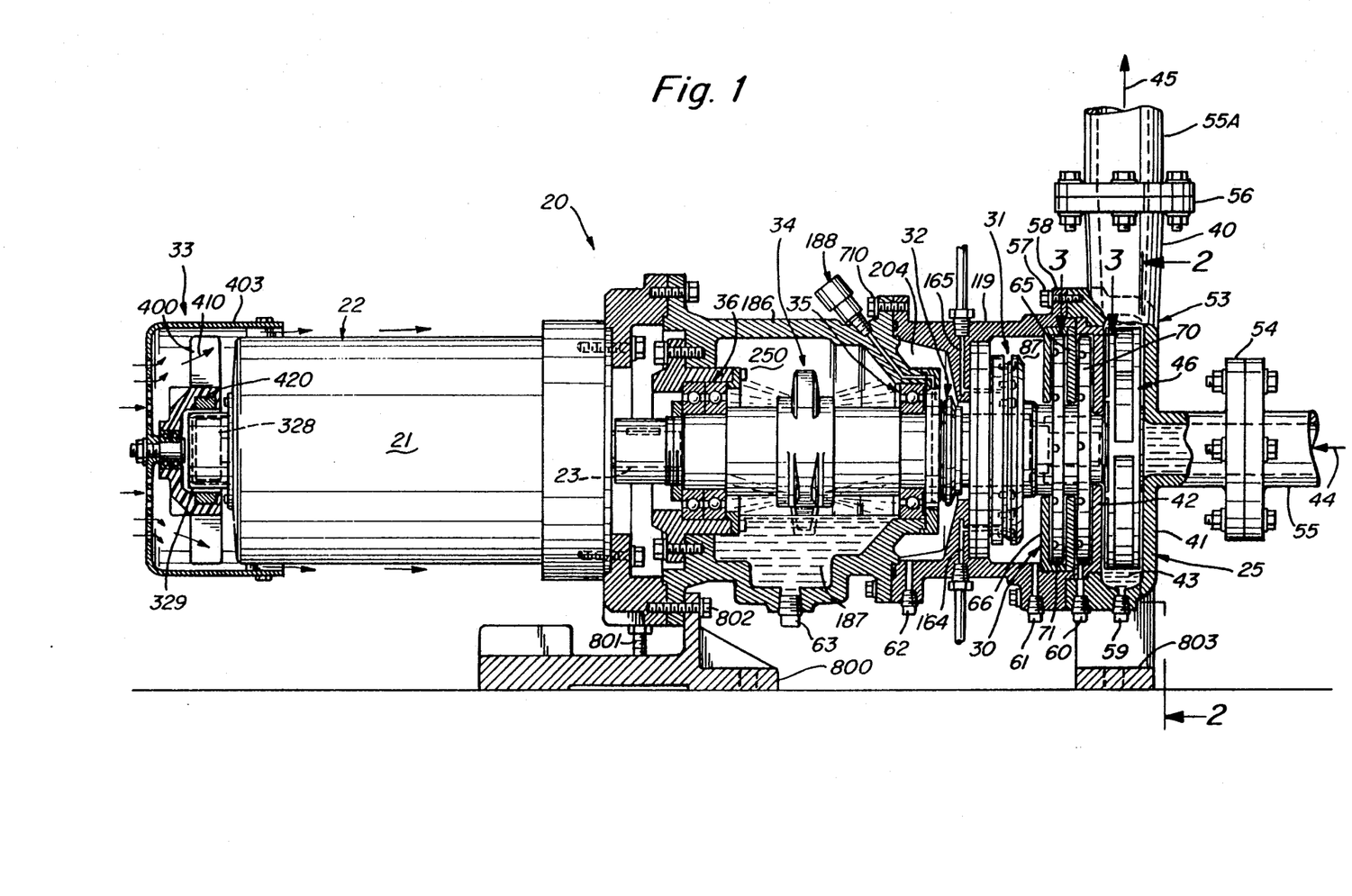
FIG. 1 is a longitudinal cross-sectional view of the pump.

A preferred embodiment of a pump in accordance with the invention intended for very high speed pumping of hazardous liquids such as acids and the like, is shown at 20 in FIG. 1. The principle components of the pump 20 comprise an electric motor 21 within an overall casing 22, having a drive shaft means 23 connected at one end to the motor 21 and at the other end to an impeller assembly 25 mounted within the composite, overall, body casing 22.

Three barrier means comprising a repeller assembly 30; a triplex seal arrangement 31; and a piston seal arrangement 32. Each barrier means is coaxial with the drive shaft means or motor drive shaft 23, and is arranged in longitudinal alignment serratim between the impeller assembly 25 and the motor 21. The barrier means function to control liquid or gas from undesired contact with either the motor 21 or the environment in which the pump 20 is used. The combination of the repeller assembly 30 and the impeller assembly 25 forms the wet end of the pump 20, shown at the right hand side of FIG. 1. At the left hand side of the pump 20, as shown in FIG. 1, a fan assembly 33 is magnetically coupled to the motor drive shaft for coaxial rotation therewith.

An oil mister assembly 34 is positioned between the barrier means and the motor 21, providing lubrication to rotary bearing assemblies 35, 36 which support the shaft 23.

Figure 2:
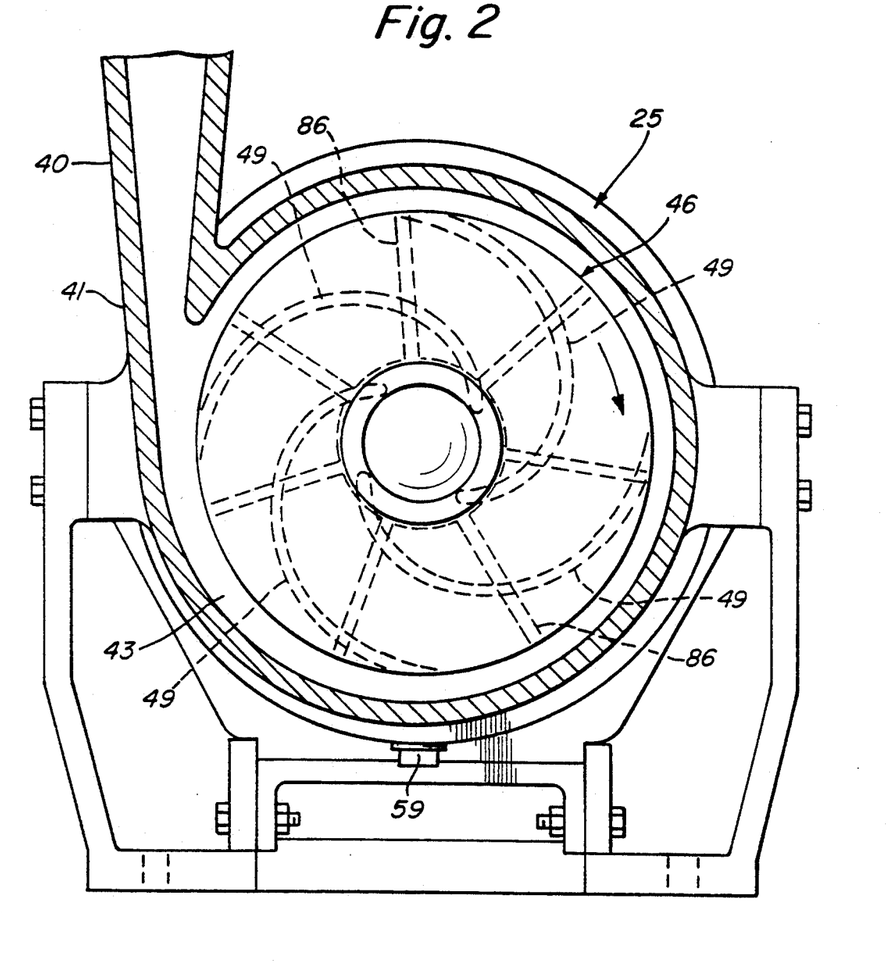
FIG. 2 is cross-sectional view of the pump taken along line 2—2 in FIG. 1.
Figures 3, 4:
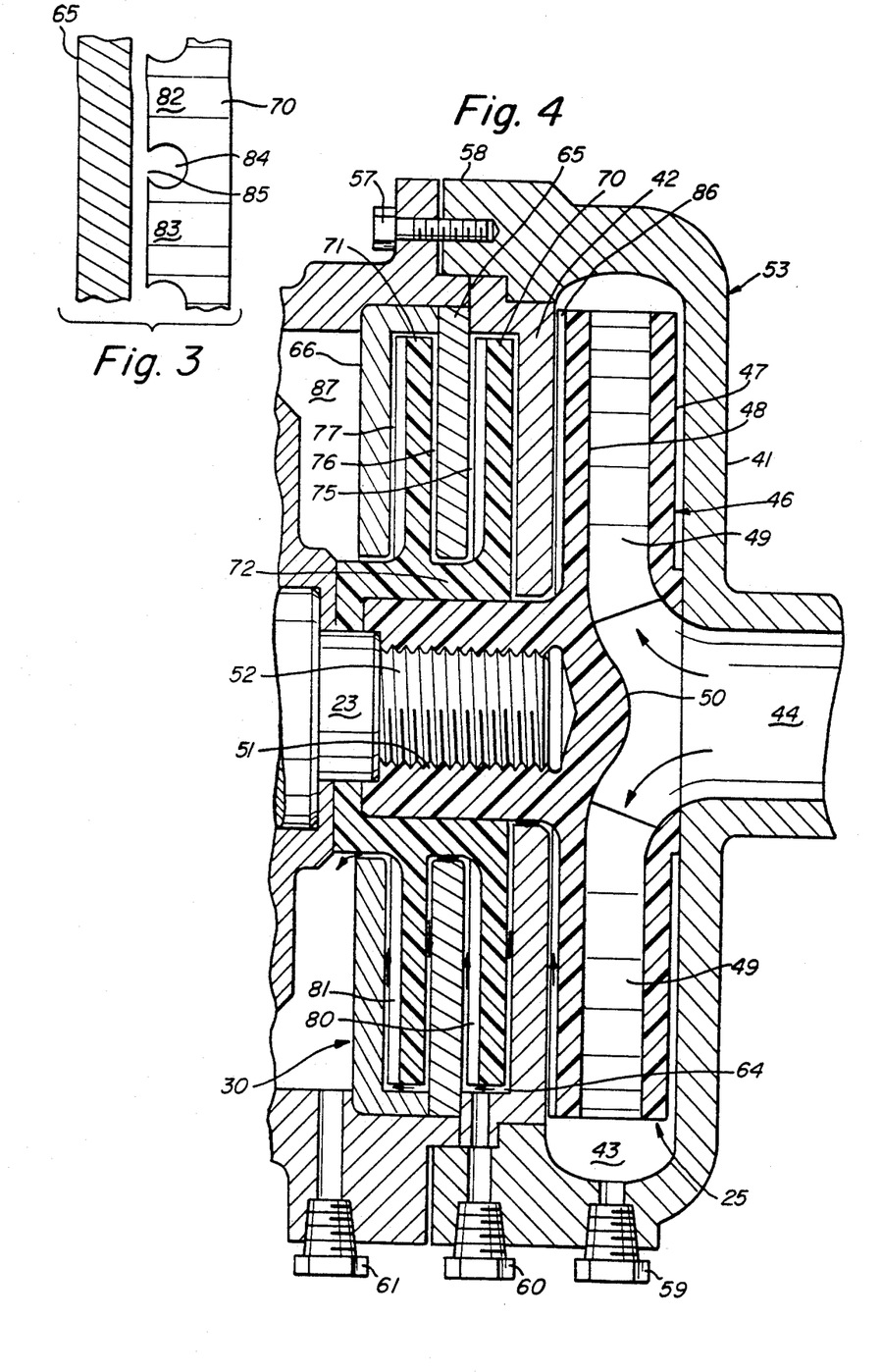
FIG. 3 is an enlarged fragmentary end view through line 3—3 of FIG. 1, showing an end of the repeller.
FIG. 4 is an enlarged fragmentary longitudinal cross-sectional view of the impeller portion.

Turning now to a description of each section of the pump 20 starting at the wet end, the impeller assembly 25 is best illustrated in FIGS. 1-3. A volute 40 is formed by metal casing portion 41 and inwardly extending backplate 42 defining a chamber 43 having a longitudinal extending opening forming an inflow path 44 for liquid and an upwardly extending outflow path 45. As liquid flows into the volute 40 through the inflow path 44, a disc shaped impeller 46 forces a substantial portion of the liquid through the outflow path 45.

The impeller 46, as shown in Figures 1 and 2, is a conventional closed impeller. In such an arrangement, the circular disc or flange shaped impeller is coaxially mounted on drive shaft 23 and includes a pair of circular facing plates, coverplate 47 and rearplate 48, with a plurality of curved radiating vanes 49 interconnecting the plates 47 and 48. The vanes 49 extend in a parabolic pattern from a domed center hub or cylindrical flange 50 of the impeller plates. The domed center hub 50 helps reduce the turbulence created by the high pressure liquid as it enters the volute 40. The rear plate 48 has a part of hub 50 which is threaded to engage a threaded portion 51 of the shaft outer end 52. Thus, the impeller 46 is coaxial with and rotates at the same rate as the shaft 23 as does the repeller.

The impeller assembly casing 53 encloses the impeller and is attached to an inflow pipe 55 at bolted, circular flange 54, an outflow pipe 55A at bolted, circular flange 56 and the overall casing 22 by a bolted circular flange 58 through eight circularly arranged screw thread bolts 57.

A screw threaded drain plug 59 and associated drainage port is mounted to allow through draining of the impeller assembly throughout the pump 20 drain plugs or fluid ports 59-63 allow for complete draining, cleaning and/or filling of their associated casing sections.

In the present embodiment, the impeller assembly 25 meets the approximate performance specifications of standard pump of ANSI/ASME B73.1M-1984. The impeller assembly 25 measures $3 \times 1.5 \times 8$ inches. Thus, the impeller diameter for this configuration is a maximum eight inches. In such an arrangement, there are usually four or five vanes 49 equidistantly spaced around the impeller, however, four vanes are shown in this embodiment. If desired, conventional back pump out vanes, such as radially extending back pump out vanes 86 (shown in dotted outline in FIG. 2), can be used. Such vanes are conventional and, as known, extend from the motor side face of rear plate 48 and tend to prevent flow toward the repeller as the impeller rotates. The pump as herein claimed, is not intended to be limited to either the ANSI standards or the API standards.

After use of the pump 20, the system can be emptied of any liquid or gas remaining within the body or casing 22. This is accomplished by opening a plurality of drainage ports or plugs 59-63 located on the bottom portion of the body 22.

While most of the liquid being pumped will exit the pump 23 through the volute outflow path 45, some of the liquid may pass behind the impeller 46 into a narrow passageway 64 shown by arrows in FIG. 4 extending from the wet end of the pump toward the fluid chamber or reservoir 87 before the triplex seal. This passageway 64 is formed by the combination of the impeller 46 and repeller assembly 30 and a plurality of inwardly extending, circular, coaxial stationary body backplates 42, 65 and 66.

After the pumped liquid enters the passageway, it travels down the first vertical portion, as seen in FIGS. 1 and 4, between the rear impeller plate and the backplate 42. The centrifugal force exerted by the rotation of impeller 46 swirls the entering liquid and expels it out and back into the volute and eventually out pipe 55A.

Under sufficient pressure, some of the liquid moves rearwardly within a first horizontal portion 65 formed by the impeller hub or collar 50 and the backplate 42. The backplate 42 also forms one of the walls of a vertical portion of the passageway 64 along with a first circular extending flange or disk 70 acting as a repeller of the repeller assembly 30. The first disk 70 is fixed to the motor shaft 23 for rotation therewith and is perpendicular to the axis of the shaft. A parallel, substantially identical second disk 71 is integral with a repeller mounting element 72 which encases a substantial portion of the impeller collar 50 and is fixed with and coaxially mounted on the shaft 23.

The mounting element 72 and the backplates 42, 65 and 66 form horizontal portions of the passageway 64 that has unwanted fluid flow from the impeller past the repeller. Horizontal fluid passageway portions are further defined by a longitudinal segment backplate 42 and disk members 70 and 71. Vertical repeller passageway portions 75 through 77 of the passageway 64 are defined by the disk members 70 and 71 and the backplates 42, 65 and 66.

The labyrinth shape of the passageway 64 at the repeller section alone is a difficult obstacle for the liquid to overcome in order to reach the motor 21. The upward, downward, and horizontal passageway elongates the distance the liquid must travel through the pump to cause damage or hazard at the motor or beyond in the atmosphere. Because liquid follows the path of least resistance, it will tend to remain in the volute 40 rather than traverse the vertical portions of the impeller passageway. One structure useful to achieve this labyrinth shape and minimize leakage passage ways, is use of a solid one piece construction for the double repeller element 72 combined with a split backplate 65. This also allows ease of assembly and perfect alignment and repeller separation.

In addition to the shape of the impeller passageway, other structures prevent the liquid from reaching the motor 21. Each repeller disk member 70 and 71 has a radial extending vane arrangement 80 and 81, respectively, located on a disc or flange face or side facing away from the impeller 46. In each of the vane arrangements 80 and 81, adjacent vanes such as 82 and 83 (FIG. 3 end view) are shaped so that together they define open-ended cylindrical channels such as channel 84 with substantially enclosed circular cross-sections forming 270° arcs, each opened at a mouth 85 on an inner face of its repeller disc.

By rotating the repeller assembly 30, most of the liquid attempting to travel downward and through the narrow passageway 64 toward the motor is forced into the channels 84 which reverses the direction of the liquid back toward the impeller assembly 25. It is important that the channels 84 not be completely enclosed. The combination of the liquid being pushed by the rotating repeller assembly 30 against the backplate 42, 65 or 66 imposes on the liquid an upward spiral motion which expels the liquid back up through the channels 84. The backplates 65, 66 and 42 are stationary and become a source of friction which is necessary for the liquid to assume the spiraling motion. This vortex type energy imposed on the liquid is similar to that imposed on the liquid by the back pump out vanes 86 of the impeller 46.

In the present embodiment, the parallel disk members 50 and 51 define ten radially extending circular channels 84 in each vane arrangement 80 and 81, with each channel having a length of 7.5 inches. Each disk 70 and 71 is not limited to 7.5 inch channels, but commonly includes length such as a 7.5 inch diameter with a cross-sectional width or diameter of approximately 0.5 inches. The repeller disks commonly include lengths between six and thirteen inches. Also, as few as four to six vanes is a reasonably functional configuration. The size and number of various elements of the pump are based on the type of liquid pumped and the pressure generated.

The drainage ports and plugs 59 and 63 of the preferred embodiment permits one to empty the chambers such as repeller cavity and a cavity 87 which collects liquid or gas being pumped which traverses the passageway 64 past the impeller. The liquid which could enter cavity 87 may do so in a number of manners: the liquid may traverse the entire narrow repeller passageway without ever entering a cylindrical channel 84; there is a failure in the repeller assembly 30; or, if the pressure of the liquid entering the repeller assembly 30 is so great as to overcome the substantial vortex energy generated by the repeller assembly.

Figure 5:
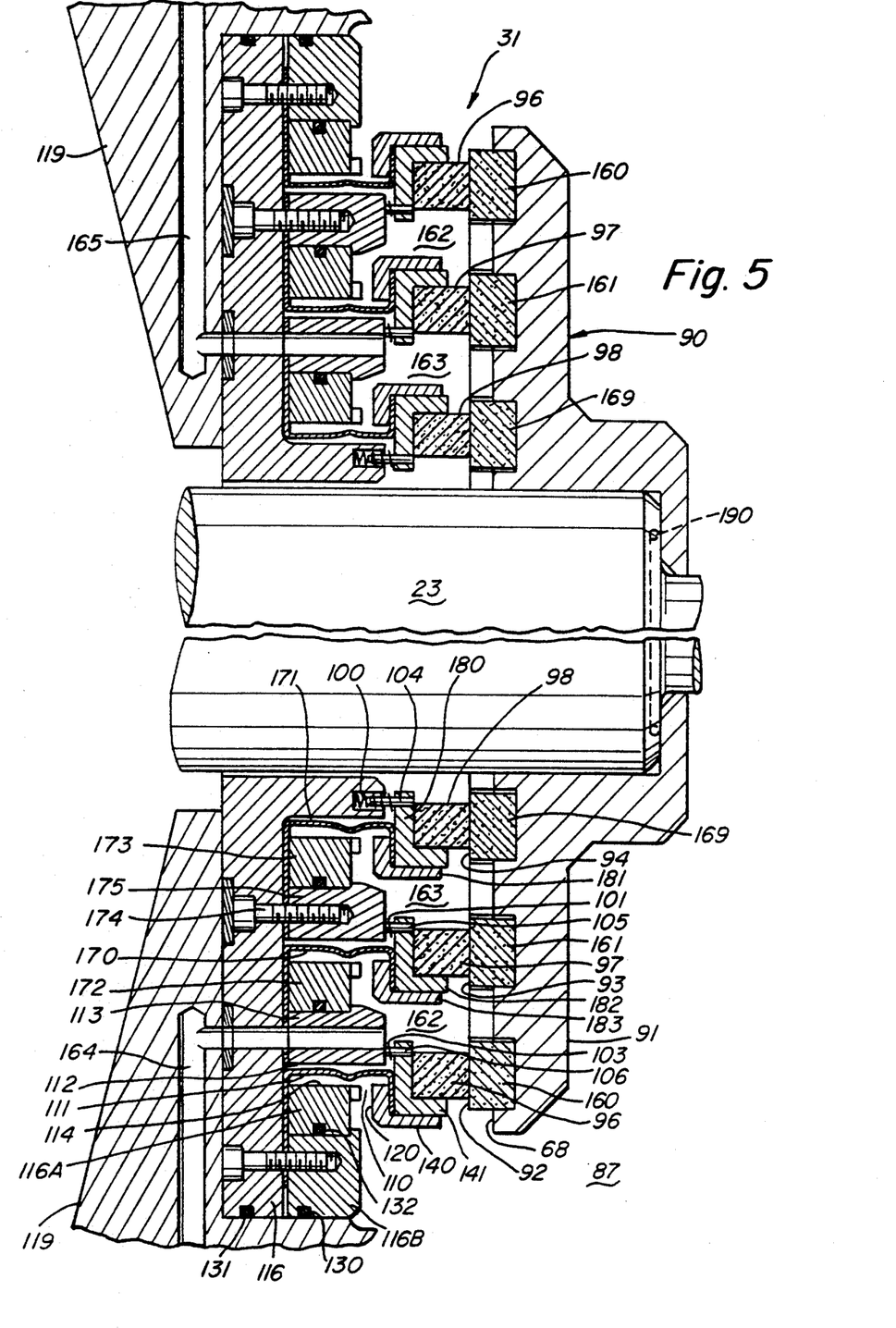
FIG. 5 is an enlarged fragmentary longitudinal cross-sectional view of the triplex seal arrangement.

After entering the cavity 87, the barrier preventing the liquid from reaching the motor 21 is the triplex seal arrangement 100 (FIG. 5). This triplex seal 100 is made up of a circular, rotating disc or flange 90 which has a cavity 87 facing side 91 and a sealing side 68 defining a sealing surface. The flange or disc 90 is coaxial with and mounted on the shaft 23 and thus rotates at the same rate along with the impeller and repeller. The actual sealing of the triplex seal 100 is the sliding engagement of a plurality of cylindrical sealing surfaces 92, 93 and 94 on the rotating flange 90 mating and forming cylindrical mating surfaces with a plurality of cylindrical sealing surfaces facing and engaging surfaces 92, 93 and 94, and provided by cylindrical tubes 96–98, coaxially with shaft 23. The initial engagement at the mating seal surfaces of the tubes and flange 90 is created by the combination of spring elements 100, 101 and 103 and rods or anti rotation pins 104, 105 and 106, respectively. Equally spaced and coaxially arranged around the triplex seal arrangement at each tube, there are ten resilient springs in this embodiment for each of the three mating sealing surfaces. The spring pressure is light and forms only a sliding contact with substantially no sealing pressure at the sealing surfaces. The tubes move longitudinally, but are stationary against rotation.

The liquid or gas being pumped which may enter the cavity 87, travels over the right hand side of the rotating flange 90 to the outer edge of sealing surface 92 and sealing tube 96. The liquid or gas then enters neck 110 where the liquid applies inward pressure on a flexible cylindrical diaphragm 111 having a thickness ranging from 0.003 to 0.004 inches. The amount of inward movement of the flexible diaphragm is limited by a top cylindrical shelf 112 of a cylindrical receptacle 113. The outward expansion of the flexible diaphragm is limited by bottom shelf 114 of block arrangement screwed to a mounting flange 116 fixed against movement by a circular flange of a circular housing or casing portion 119. Casing portion 119 is bolted by eight circumferentially arranged bolts at each end, as shown at 710 and associated casing flange.

During operation of the pump, the flexible diaphragm 111 has two possible positions. One position is assumed when the diaphragm 111 is pressed against the top shelf 112, and the other when the diaphragm 111 is pressed against the bottom shelf 114. While having the diaphragm assume a position between the two mentioned positions is theoretically possible, practically it does not occur in use of the pump.

The position assumed by the diaphragm 111 defines the area at a pressure applying surface 120 to which pressure is applied to the sealing tube 96. The cylindrical diaphragm 111 is mounted by a clamp provided by clamping rings or blocks 116, 116a and 116b, all sealed by resilient O-ring seals 130 on flange 119. In addition, the diaphragm 111, 171 and 174 each serve as either a primary or secondary seal, depending on temperature requirements. The sealing tube 96 and diaphragm 111 are mounted at the flange end 119 by bent over continuous, circular, metal collars or stabilizer holders 140 and 141 welded, press fitted or otherwise attached to each other as shown at FIG. 5.

The area of surface 120 comprises that portion of a circular holder 140 which is either between the cylindrical, longitudinal plane defined by the bottom shelf 114 and the flexible diaphragm 111 in a radially outward position, or between the cylindrical, longitudinal plane defined by the top shelf 112 and the diaphragm 111 in the inward position. By extending the distance between the top shelf 112 and the bottom shelf 114, one may vary the pressure applying cylindrical area of surface 120. The seal pressure applying surface 120 is made up of the entire face of the collar 140 facing the motor, but its area is varied by movement of the diaphragm as described. The diaphragm can be of rubber, plastic or any resilient material including metals.

The pressure applying area dimensions are selected based on the amount of closing force desired on the sealing surface of tube 96 against the flange or disc sealing surface 92. In the present embodiment, the area 120 is 75% of the facing mating surface of the sealing tube 96 which engages the sealing surface 92 of the rotating flange 90. With more viscous liquids, a greater percentage pressure applying surface may be necessary. By creating a system wherein the pressure applying surface is always proportional to the sealing surface, one minimizes the frictional forces while maintaining a desired fluid seal across the mating sealing surfaces of the flange 90 and tube 96. Continuous circular sealing rings 160, 161, 169 abut the tubes 96, 97, 98 respectively and are mounted on and fixed to the sealing surface of flange 90, preferably in circular grooves as shown in FIG. 5.

Chambers 162 and 163 are formed between the sealing tubes and may be filled with a gas or liquid as desired through injection ports 164 and 165 which define circular bores leading to the chambers. Often, one of the chambers 162 or 163 will be filled with a second liquid other than that being pumped. Such liquid can be used to apply pressure to the associated diaphragm to counteract or adjust the effect of fluid which may fill chamber 87 and act on sealing surface 92 and the outside of diaphragm 111 Liquid or gas in backup chamber 162 and/or chamber 163 can be used to monitor pressure in each chamber and/or detect leakage in each chamber. The injection ports 164 and 165 may also be used to monitor the amount of pressure in chambers 162 and 163 respectively, and to determine whether greater pressure is required to prevent the seals formed at sealing surfaces 92, 93 and 94 from opening.

While only the diaphragm 111 and its associated tube 96, with mating and sealing surfaces and holders as claimed, has been described. Identical parts are used and duplicated to form the triplex seal. Thus, diaphragms 170 and 171 are mounted through mounting rings or holders 172 and 173, bolts 174, holders 180, 181, 182 and 183 to form the triplex seal having dual chambers 162 and 163, with each tube having its backup diaphragm so as to provide a pressure applying surface whose area can be varied to vary the sealing pressure at the mating surfaces of each tube and each sliding contact surface with the disc 90.

The right hand side of the disc 90, as shown in FIG. 5, is first exposed to the fluid that passes the repeller, filling chamber 87 and also applies a pressure to the diaphragm and to the pressure applying surface 120. The pressure applying surface of tubes 97 and 98 are only activated by pressure within the chamber 162 and 163, and only by predetermined pressure caused by filling these chambers if desired. In the only case of other pressure being applied in chambers 162 and 163, there would be a differentiation in pressure which is predetermined in the chambers if there is leakage through the first tube 96, causing a different pressure on the rear pressure applying surface of tube 97 and, similarly, if there is leakage of fluid from chamber 162 through tube 97, there would then be a different pressure on the pressure applying surface of tube 98 In some cases, the liquid pressure in chamber 87 may be the predetermined pressure applied in chambers 162 and 163.

In some cases, a single tube 96 and diaphragm 111 can be used and the chamber 162 is the only chamber which is, in fact, a circular chamber with no tubular arrangements defined by tubes 97 and 98. Similarly, a double seal can be formed or quadruple or higher numbers of rotating sealing surfaces can be used.

The flange 90 is fixed to the pump shaft 23 and suitable resilient O-rings, gaskets or other means are used to provide conventional positive seals as at 190.

Figure 6:
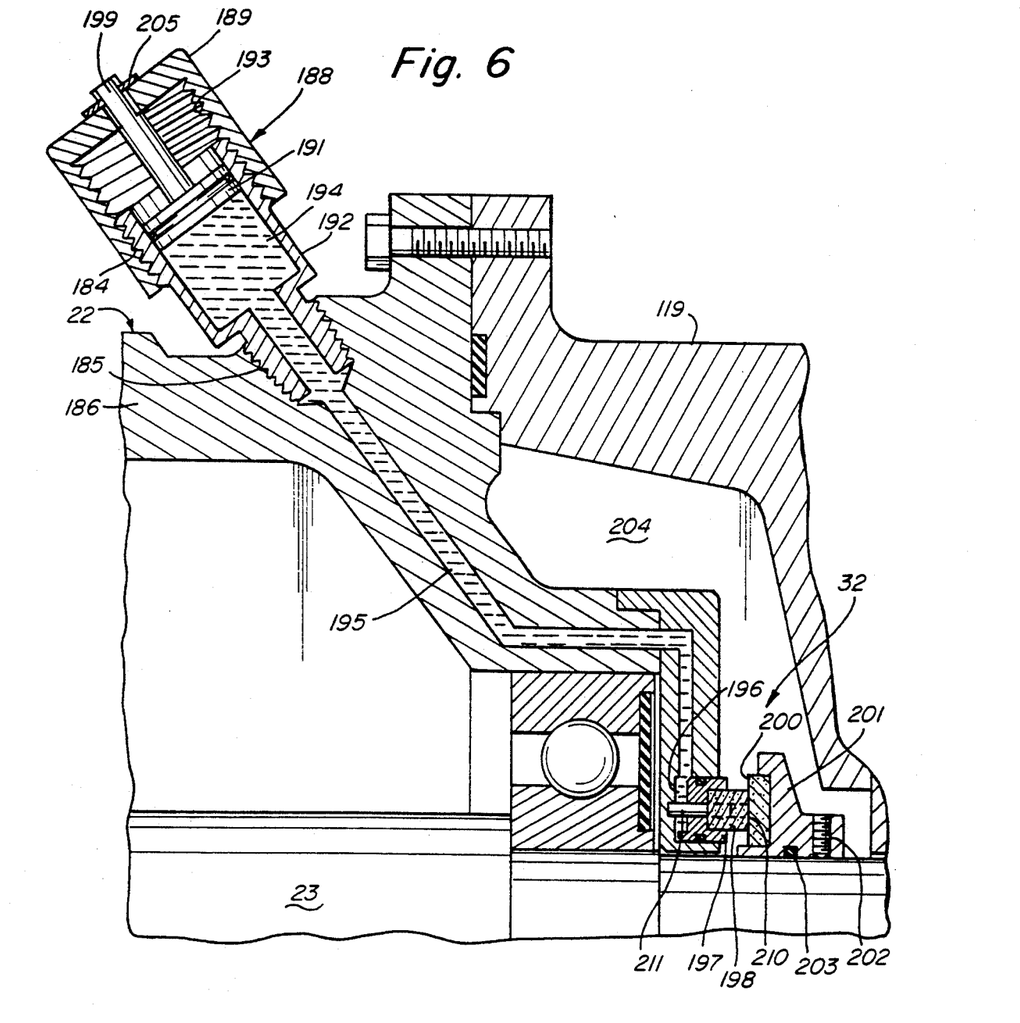
FIG. 6 is an enlarged fragmentary longitudinal cross-sectional view of the piston seal arrangement.

If unwanted, excess liquid pumped passes through the triplex seal, the next barrier which the liquid meets is the piston seal arrangement 32 (FIGS. 1, 6). A cylindrical piston head 180 has a cap 181 which is threadably engaged to a piston body 182 by screw threads 183 and 184. The piston body 182 has additional screw threads 185 to engage the screw threads of a cylindrical casing portion 186 of main casing 22. A piston stem 190 is fixed and attached to the piston cap 181 and extends into the piston head 180. The stem 190 is held stationary with the cap by a disc seal 400. A resilient O-ring seals a sliding reservoir disc 191. The piston body opening 194 coincides with a channel bore 195. The channel 195 extends into a circular reservoir or pressure applying chamber 196 which forms a ring coaxial with the shaft 23 and is bounded on one side by an axially slidable circular ring holder 197 which secures an axially sliding sealing tube 198 in position.

The cylindrical tube 198 is identical to tubes 96, 97 and 98 and has the same sealing function at a circular sealing surface of a rotating cylindrical sealing surface 210 of a flange or disc 201 which is fixed to shaft 23 by threaded pin 202 and O ring seal 203. The reservoir or chamber 196 is concentric with the shaft 23 tube and pressure of hydraulic liquid therein applies pressure to sealing surface 200. The stationary sealing surface or face 210 of the tube mates with a cylindrical sealing and mating surface 200 forming a seal therebetween. To prevent the rotation of the longitudinally slidable tube, a group of anti-rotational pins 211 having circular or non circular cross-sections extend through the reservoir 196 and into the stationary holder 197. The pins 211 are four in number arranged in a circle coaxial with both the shaft 23 and tube 198 and spaced equidistantly around the piston seal arrangement. The number of pins 211 can vary with two or more such pins normally used. The tube 198 is secured to holder 197 which is attached to a circular flange portion pump casing 186, against rotational movement. The tube 198 and holder 197 slide on pins 211 when pressure is increased or decreased in circular reservoir 196.

The rotary sliding surface 200 rotates at the same speed as the shaft 23. The strength of the seal created by the face 200 and the relatively rotary face of the tube is increased by screwing down the piston cap 181 to create more pressure in the reservoir through the piston 180. This increase in pressure translates to more pressure on the rear pressure applying face of holder 197, which increases the pressure on the mating surfaces of the tube 198, a mating circular disc 201, as the disc rotates, as well as when it is stationary. The disc 201 provides the mating sealing surface 200.

The piston seal may only be useful if the pumped liquid or gas has passed through the triplex seal arrangement and repeller into chamber 204. The friction that is created by sealing the rotary face of disc 201 against the stationary face of the tube 198 can decrease the efficiency of the pump and thus the piston seal may be deactuated or adjusted as desired by means of the piston pressure in particular situations. By attaching a pressure gauge to one of the injection ports 164 or 165, one may automatically activate the piston seal if escape of the liquid beyond the triplex seal arrangement is detected to be imminent. Thus, the user need only allow the piston seal to actuate when necessary, if this is desired.

Alternately, the piston seal can be maintained at a relatively low seal closing pressure at all times to maintain the oil within the bearings from leaking out to chamber 204.

Figure 7:
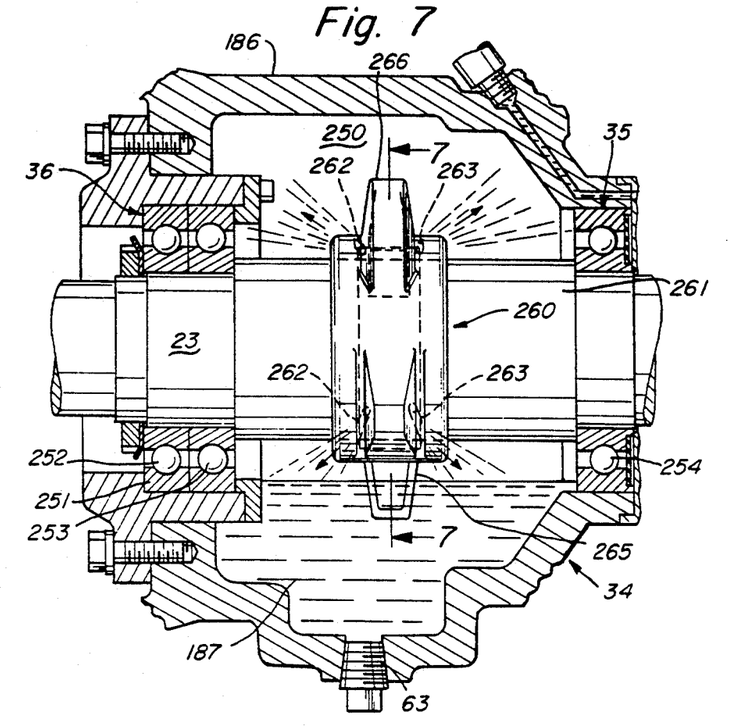
FIG. 7 is an enlarged fragmentary longitudinal cross-sectional view of the oil mister.
Figure 8:
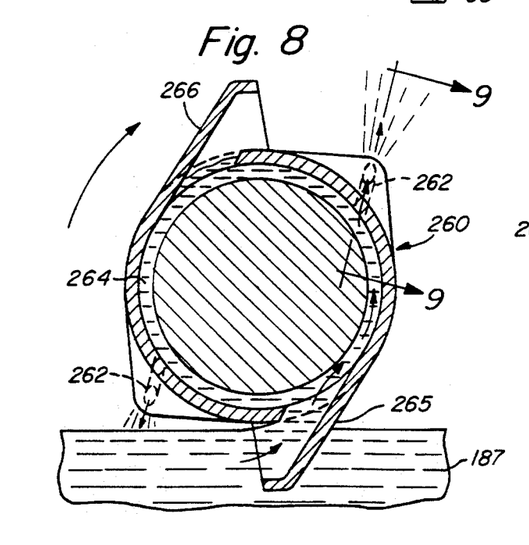
FIG. 8 is a cross-sectional view of the oil mister taken along 8—8 in FIG. 7.
Figure 9:
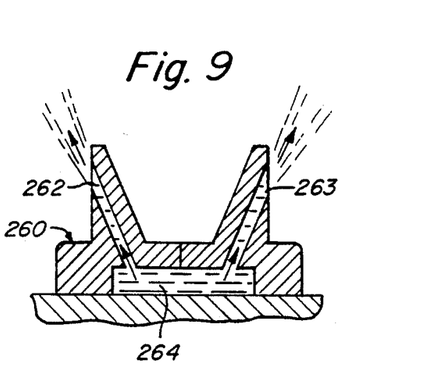
FIG. 9 is cross-sectional view of a portion of the oil mister taken along 9—9 in FIG. 8.

Turning now to the oil mister assembly 34, as best shown in FIGS. 7-9, a casing 186 defines a chamber 250 surrounding the shaft 23 and having a lower well 187 which can be filled with a lubricating oil or other liquid. Conventional rotating bearings such as ball bearings are shown at 251 and 252, coaxial with and mounting the motor shaft 23 for rotation. The bearings each are of conventional ring design with a plurality of sliding balls such as 252, 253, and 254 coaxially arranged about the shaft 23, as known in the art. The ball bearings allow free rotation of the shaft.

A dispenser 260 is fixed to the shaft for rotation therewith on a sleeve 261. The dispenser 260 has nozzles formed by bores 262 and 263 on opposed sides of the dispenser body. The bores 262 and 263 are each associated with a tubular passageway 264 having scoops in the form of hoods 265 and 266 which are mounted on a disc of sleeve 261 keyed to the shaft 23. The disc defines the scoops as entraining means for directing lubricating liquids to their respective nozzles The nozzles are directed outwardly and forms means which are mounted in a pathway defined by the dispenser disc. Since the nozzles are directed towards each rotary seal, on opposed sides of the disc or dispenser, as the shaft rotates by rotating the scoops of the disc, a controlled flow of liquid or mist is automatically passed to the bearings. By suitable selection of the scoop and nozzle arrangement, one can direct the fluid exactly where one wants to direct the fluid, that is, toward the ball bearings, without immersing the bearings in fluid, yet allowing a sufficient amount for lubrication.

Proper selection of the scoop's rotation and nozzle means also allows a misting action to mist the lubricating fluid such as oil. Thus, a spray can be directed at the ball bearings directly where needed from opposing faces of the dispenser in a rotary motion, thereby misting the ball bearings without causing liquid filling which might hamper the rotary bearing action.

FIG. 9 illustrates the action of the scoop in a cross-section as the dispenser rotates. Direct lubrication of the bearing could flood the bearing assembly and increase friction. Preferably, misting action is desired and proper placement of the dispensed fluid or liquid as the shaft rotates is preferred.

Figure 10:
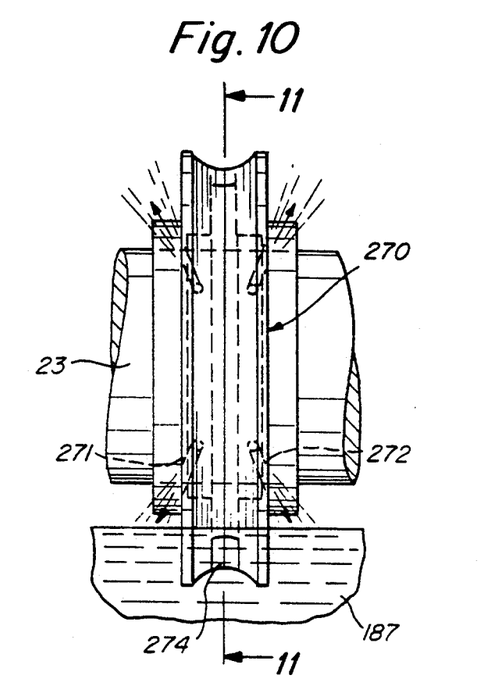
FIG. 10 is an enlarged fragmentary longitudinal cross-sectional view of a second embodiment of the oil mister.
Figure 11:
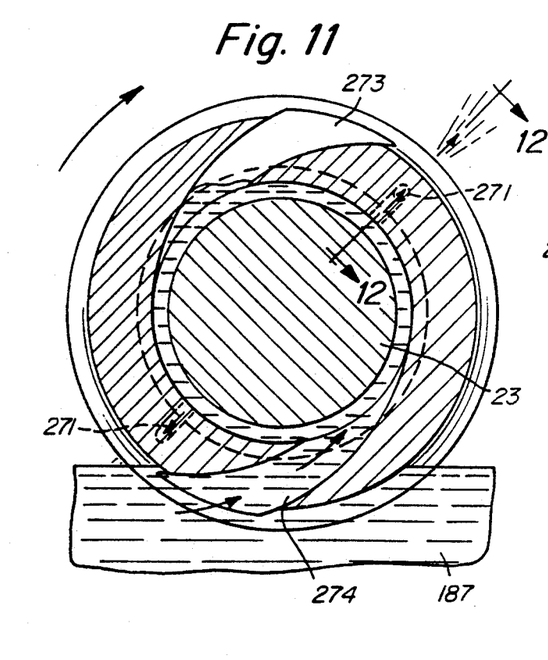
FIG. 11 is a cross-sectional view of the second embodiment of the oil mister taken along 11—11 in FIG. 10.
Figure 12:
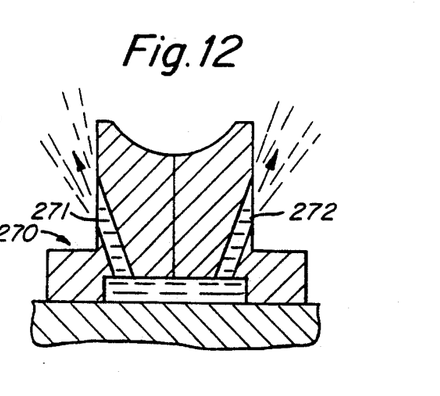
FIG. 12 is cross-sectional view of a portion of the second embodiment of the oil mister taken along 12—12 in FIG. 11.

In an alternate embodiment of the mist arrangement shown in FIG. 10-12, the dispenser 270 is in the form of a disc which has an encircling grove perpendicular to the axis of the shaft. The grove is provided with nozzle means 271 and 272 and a scoop action provided by channels 273 and 274 which rotate in the fluid chamber as shown. Thus, the nozzle means provide for flow of oil, preferably in misted form, towards the bearings on opposed sides of the dispenser 270.

Figure 13:
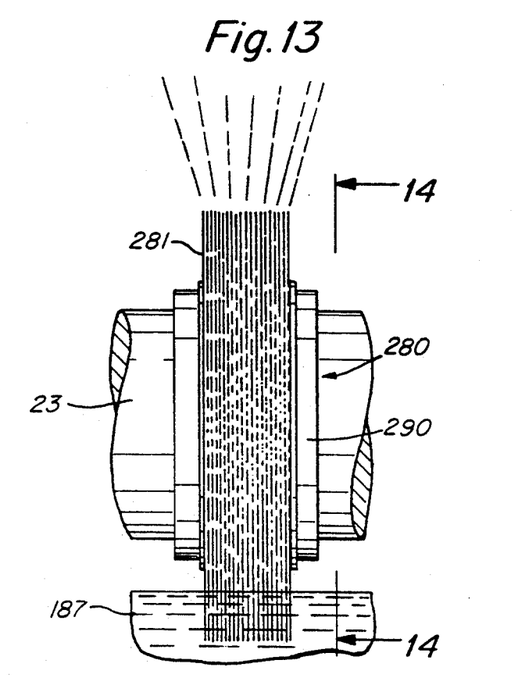
FIG. 13 is an enlarged fragmentary longitudinal cross-sectional view of a third embodiment of the oil mister.
Figure 14:
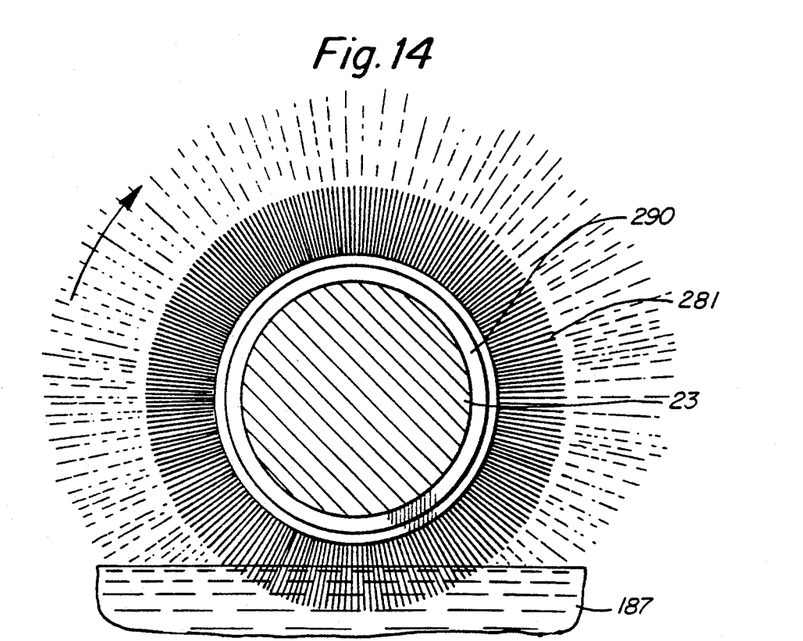
FIG. 14 is a cross-sectional view of the third embodiment of the oil mister taken along 14—14 in FIG. 13.

In still another arrangement for providing oil to the opposed rotary bearings, a coaxially arranged dispenser 280 carries a plurality of bristles 281 which are mounted on the shaft 23 for rotation therewith. As the bristles, which can be wire bristles, are rotated through the trough carrying the oil, the oil is picked up, misted and directed toward the opposed rotary bearings. The bristles can be mounted on a suitable disc sleeve 290 in any conventional manner known in the art. In the present case, they are adhesively adhered through adhesive means not shown. Welding, soldering and the like can be used. The wire bristle dispenser of FIGS. 13 and 14 provides for a fine mist which is particularly preferred.

Figure 15:
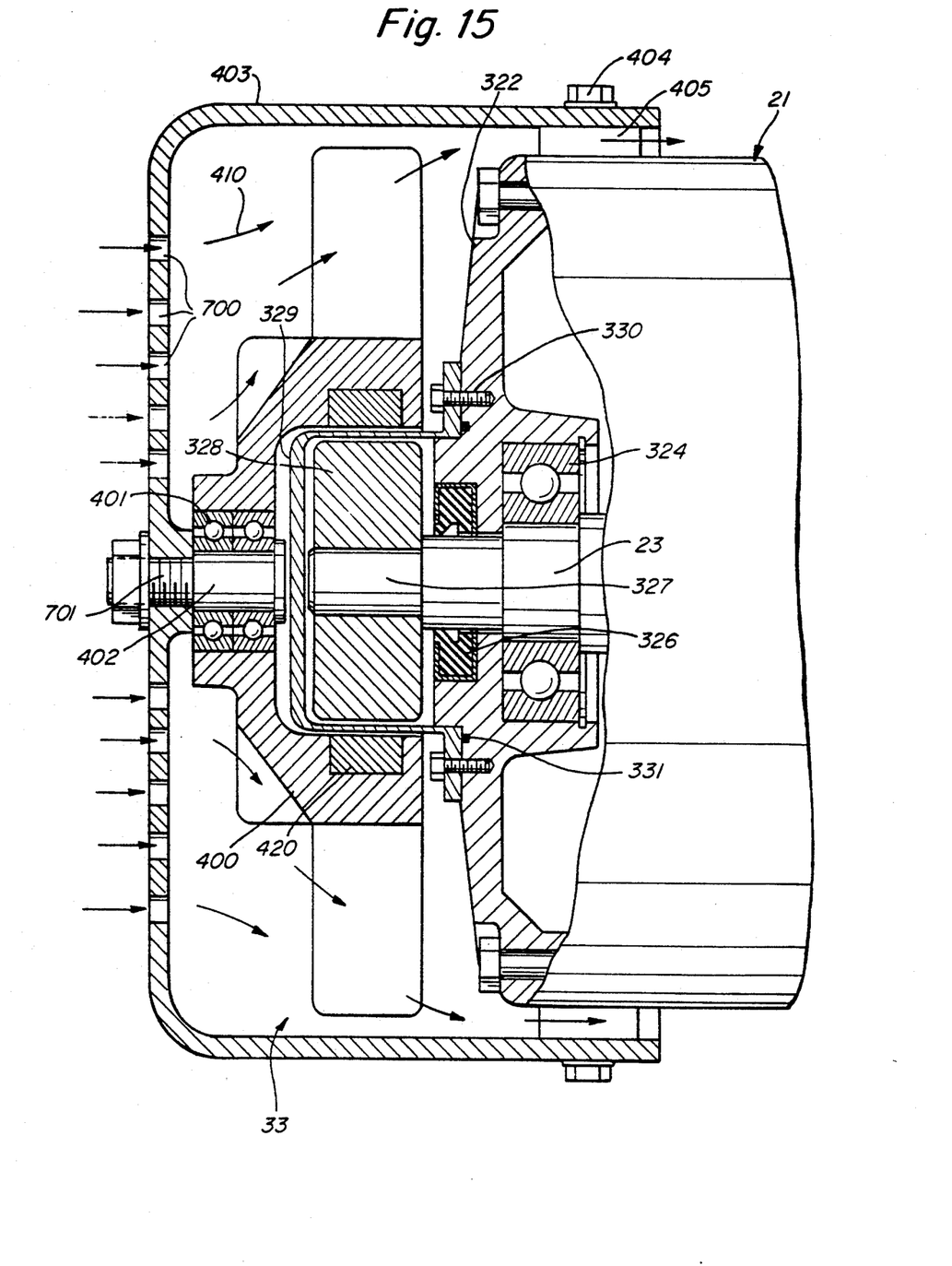
FIG. 15 is an enlarged fragmentary longitudinal cross-sectional view of the motor fan arrangement.

Turning now to the next section of the pump of this invention, the pump motor 21 has a casing portion of housing 22 of any conventional design and has its shaft, indicated at 23, passing through the motor. Conventional bearings 324 are provided as known in the art, as is a rotary end seal coaxial ring 326. The motor drive shaft 23 has a reduced diameter end 327 mounting a doughnut-shaped magnet 328. The magnet and shaft are enclosed in an end cap 329 bolted to and sealed to the motor end by 8 circularly, evenly spaced, arranged screw threaded bolts 330, with sealing O-ring resilient gasket 331 of a suitable neoprene or other rubber, as can be used for any of the seals of this invention. O-ring seals can also be of metal as known in the art.

Because the end cap 329 is used, the motor is totally sealed. The cap is of a non-magnetic material such as plastic as known in the art. Non magnetic metals can also be used for the cap. Thus, the sealed motor provides a further barrier. Should any hazardous liquid or gas escape along the shaft to the motor, it will be stopped by the cap.

The doughnut 328 provides for actuating through the drive shaft 23, a cooling fan shown at 400. The fan 400 is mounted by bolt 701 on a rotary bearing 401 which is fixed by a shaft 402 to an outer flow directing casing 403, 8 bolts 404 and washer standoffs fix the casing or cap 403 to the motor casing. Air passageways are provided as shown by arrows 410 to allow cooling environmental air and other fluid from the fan 400 to be directed from the environment through holes 700 along the motor casing, as shown by the arrows 410. The fan 400 can be any standard fan blade. A magnetic mass, as of iron where a magnet is used for the doughnut 328, is provided in the form of an inset encircling ring 420. Thus, the magnetic mass 420 is actuated by rotation of the motor shaft 23 through the doughnut 328 of magnetic means as known in the art, to provide a cooling action to the motor, yet have the cooling fan sealed and environmentally protected from possible escape of fluids through the pump.

As known in the art, the magnet and iron or magnetic mass can be switched with either mounted on the shaft or the fan blade. Opposed pole drive magnets can be used as known in the art.

Mounting support brackets 800, 803 can be used along with adjusting bolts and mounting bolts 802. Conventional stands or holders of known types can be used.

While specific embodiments of this invention have been shown and described, many variations are possible. In all cases, it is desired to prevent fluid or gas escape along a drive shaft when a pump is operated by a drive motor. This is particularly important when pumping hazardous fluids. In some cases, individual components of this invention can be used in other rotary sealing or fluid impeding devices, as for example, sealing rotary shafts of compressors which are considered pumps, or other rotating devices.

While specifics have been described, various sizes, dimensions, pumping values and the like can be used, as will be obvious to one skilled in the art. Generally, pumps are used for pumping hazardous fluids under ratings of various EPA and OSHA regulations described in public law 101-DTD November 1990. This is exemplery but not inclusive jof all dangerous, toxic, carcinogenic, and volatile compounds. While all components of the pump are preferably metal, except as specifically described, many materials can be used as known in the art. The tubes which form the sealing surfaces can, for example, be formed of tungsten carbide, carbon, silicone carbide or other materials. Similarly, the blocks or rings which form the mating sliding seal surfaces can be formed of the same materials or different materials, including carbon, tungsten carbide, silicone carbide and metals. In some cases, sliding seals can be formed between polytetrofluoroethylene, Kel F (a trademarked product of DuPont, Wilmington, Del.) or other low friction materials.

Particularly with regard to the triplex seal, a single sealing surface of an enclosing circular seal can be formed by a single tube and diaphragm arrangement with limiting stops on either side of the diaphragm. The particular seals of this invention can be used alone, in combination, or in any combination of parts enclosed herewith. Obviously, if a single seal or more than one barrier means is eliminated from the pump, its sealing function will be lost but other seals remain as described.

The fact that the pump can use ball bearings for the opposed bearings of the drive shaft, thus avoiding sleeve bearings, and the fact that a series of drain plug can be used to provide simple and complete drainage of fluid in the pump safely, prior to tear down of the pump for cleaning and repairs, is particularly useful when pumping fluids which may have particles which would otherwise perhaps obstruct sleeve bearings or cause problems in pumps of this nature.

While circular sealing surfaces have been described, disc and circular flanges all mounted coaxially with the shaft, or other configurations can be provided as known in the art. Thus, the shaft and casing need not be of circular cross-section, but can be of square or irregular cross-sections if desired. In all cases, the sealing surfaces are encircling about the shaft to fully seal the shaft against fluid flow from the right hand end to the left hand end of the pump as shown in FIG. 1. Although the casing is a multipart casing bolted together using suitable seals as known in the art, casing design can vary greatly. In some cases, repellers can be eliminated and seals alone or a single seal used to prevent damage to the fan motor and environment by fluids pumped by the pump of this invention.

It is not intended that the scope of this invention be limited to any single embodiment illustrated and described. Rather, it is intended that the scope of the invention be determined by the appended claims and their equivalents.

What is claimed is:

1. A seal construction for sealing a rotating shaft against passage of a fluid along a central axis of said rotating shaft, said seal construction comprising:
    a) a sealing flange means fixedly mounted on said shaft and rotatable therewith about said central axis, said sealing flange having a forward and rear surface, each of said surfaces central axis, said forward surface of said flange being exposed to said fluid to be sealed against and
    a stationary sealing means for creating a fluid seal between said rear surface of said rotatable sealing flange and said stationary sealing means, said stationary sealing means comprising:
    an engaging member having a first forward surface located for sealing engagement with said rear surface of said sealing flange and a second rearward surface, said engaging member being spaced radially outwardly from and extending circumferentially around said rotating shaft,
    biasing means for normally urging said first forward surface of said engaging member into sealing engagement with said rear surface of said sealing flange,
    a fluid passageway communicating said fluid to be sealed with said second rearward surface of said engaging member, and
    a diaphragm means extending across said fluid passageway for determining the amount of force placed on the said second rearward surface of said engaging member by said fluid to be sealed, said diaphragm means being attached across said fluid passageway in such a way that any increase in pressure of said fluid to be sealed upon said diaphragm will cause said diaphragm to flex radially inwardly, thereby increasing the surface area of said second rearward surface of said engaging member exposed to the pressure of said fluid to be sealed, the net effect of said radially inward flexing of said diaphragm means being to further urge said first forward surface of said engaging member into sealing engagement with said rear surface of said sealing flange.

2. A seal construction according to claim 1 wherein said stationary sealing means further comprises in addition to said first engaging member, at least a second engaging member having a second forward surface located for sealing engagement with said rear surface of said sealing flange and a third rearward surface, said second engaging member being spaced radially outwardly from and extending around said first engaging member, thereby to provide a chamber between said second engaging member and said diaphragm means,
    biasing means for normally urging said second forward surface of said second engaging member into engagement with said rear surface of said sealing flange, and
    orifice means communicating with said chamber for providing a fluid under pressure into said chamber at a pressure which may be used to control the amount and direction of flexing of said diaphragm means.

3. A seal construction according to claim 2 wherein said second engaging member has a second diaphragm means attached at one of its ends to said third rearward surface of said second engaging member and extending across a fluid passageway communicating a fluid to be sealed such that said second diaphragm means defines a wall of said chamber, said second diaphragm means being attached at its other end and so attached to said third rearward surface such that any increase in the pressure in said chamber upon said second diaphragm means will cause said second diaphragm means to flex radially inwardly and said first diaphragm means to flex radially outwardly in a manner which increases the surface area of said second and third rearward surfaces of said engaging members to said exposed pressure, the net effect of such flexing of said first and second diaphragm means being to further urge said first and second forward surface of said first and second engaging members into sealing engagement with said rear surface of said sealing flange.

4. A seal construction according to claim 3 wherein said seal construction comprises at least two radially and concentrically spaced chambers each having an orifice therein for providing a fluid thereto, and a plurality of diaphragm means each defining a wall in at least one of said chambers and being connected to a respective rearward surface of one of a plurality of said engaging members such that each said diaphragm means will flex upon an increase in pressure in a chamber of which it is a walled part, thereby to increase the surface area of any rearward surface of an engaging member associated with said diaphragm means, the net effect of such flexing being to further urge the said forward end of that engaging member into sealing engagement with said rear surface of said sealing flange.

5. A seal construction according to claim 4 wherein there is further provided stop means for limiting the amount of flexing of each of diaphragm means.

6. A seal construction according to claim 5 wherein each said engaging member comprises a substantially circular sealing tube and wherein said rear surface of said rotatable flange includes a substantially circular sealing ring for each said sealing tube, each said sealing ring being radially spaced from and extending circumferentially around said shaft and being so located as to be in sealing engagement with its respective sealing ring.

* * * * *